US006231963B1

(12) United States Patent
Lehner et al.

(10) Patent No.: US 6,231,963 B1
(45) Date of Patent: May 15, 2001

(54) MAGNETIC RECORDING MEDIA

(75) Inventors: August Lehner, Rödersheim-Gronau; Helmut Jakusch, Frankenthal; Volker Koch, Battenberg; Manfred Ohlinger, Frankenthal; Albert Kohl, Laumersheim; Werner Lenz, Bad Dürkheim; Norbert Schneider, Altrip; Peter Heilmann, Bad Dürkheim; Werner Hübner, Frankenthal; Erich Hoffmann, Heidelberg; Ronald John Veitch, Maxdorf; Rudi Lehnert, Ludwigshafen; Harald Jachow, Worms, all of (DE)

(73) Assignee: EMTEC Magnetics GmbH, Ludwigshafen (DE)

( * ) Notice: Subject to any disclaimer, the term of this patent is extended or adjusted under 35 U.S.C. 154(b) by 0 days.

(21) Appl. No.: 08/913,808

(22) PCT Filed: Mar. 18, 1996

(86) PCT No.: PCT/EP96/01155

§ 371 Date: Mar. 17, 1998

§ 102(e) Date: Mar. 17, 1998

(87) PCT Pub. No.: WO96/30900

PCT Pub. Date: Oct. 3, 1996

(30) Foreign Application Priority Data

Mar. 27, 1995 (DE) ............................................... 195 11 239

(51) Int. Cl.⁷ ....................................................... G11B 5/733
(52) U.S. Cl. .......................... 428/323; 428/328; 428/329; 428/694 BA; 428/694 BS; 428/694 BN; 428/900
(58) Field of Search ...................... 428/694 BA, 694 BS, 428/694 BN, 323, 328, 329, 900

(56) References Cited

U.S. PATENT DOCUMENTS

| 4,952,444 | * | 8/1990 | Kawamata et al. | .................. 428/141 |
| 5,164,173 | * | 11/1992 | Müller et al. | ........................ 423/607 |
| 5,480,732 | * | 1/1996 | Aoki et al. | ....................... 428/694 B |
| 5,645,917 | * | 7/1997 | Ejiri et al. | ............................. 428/141 |

* cited by examiner

*Primary Examiner*—Stevan A. Resan
(74) *Attorney, Agent, or Firm*—Keil & Weinkauf

(57) ABSTRACT

Described are tape-type magnetic recording media (I) including a non-magnetic substrate (III), at least one film applied to the substrate and, in at least one of these films, an inorganic acicular pigment (II) suitable for use as a supporting pigment, the ratio of the mean length to the mean diameter of the pigment (II) being at least 3 and the mean modulus of elasticity of the films being not less than 15 GPa in the longitudinal direction of the tape-type recording medium (I).

11 Claims, No Drawings

MAGNETIC RECORDING MEDIA

In the case of modern magnetic recording media, there is constantly the desire for greater storage capacity and for faster access to the stored information. For the tape-like recording media, these requirements imply, in the first case, a continuous reduction in the tape thickness on the one hand and, on the other hand, a continuous decrease in the thickness of the magnetic layer, at least for the longitudinal recording method predominantly used in practice. In the second case, the result is a constantly increasing tape speed. For example, tape-like recording media having a high storage capacity now have a tape thickness of only 10 μm, the magnetic layer thickness relevant for the write and read operation being about 1 μm, and the tape speed in modern high-speed drives may be in the region of a few meters per second.

Particularly in start-stop operation, when it is intended to access preselected information packages, high accelerations may act on the magnetic recording medium in the longitudinal direction in some cases. Associated with this is a dynamic tensile load with short-term, high dynamic tensile stress values which act over the cross-section of the tape. This may even be sufficient to result in plastic deformation of the tape-like recording medium, which may lead to tearing under continuous stress with recurring load changes.

Polyester films, for example comprising polyethylene terephthalate, are usually used as substrate material for tape-like recording media. It is known that the modulus of elasticity of this material is from 4 to 8 GPa, corresponding to the exact conditions of the production process, and that the elastic limit is not more than about 0.5% elongation. These values are measured in the static tensile test on film samples which are cut in the machine direction of the film production machine and clamped in a suitable tensile tester. Thus, the substrate material itself can elastically absorb a maximum tensile stress which is not more than the product of these two characteristics, ie. 40 MPa.

In EP-A 0 520 155, the elasticity range of modern magnetic layers having small thicknesses of less than or equal to 1 μm was characterized by a minimum yield point of 30 MPa and by a minimum elongation at yield of 0.2%. The stated elastic limits for the substrate and the magnetic layer resulted in an elastic tensile stress of from 30 to 40 MPa with an elastic elongation of from 0.2 to 0.5% for the tape-like recording medium composed of said substrate and said layer.

Further publications on the subject of the elasticity of tape-like recording media are JP-A 57-078 630, JP-A 57-078 629 and JP-A 02-260 229. The inventive concept of the first two publications consists in establishing the ratio of the moduli of elasticity in the longitudinal and transverse directions at not more than 2.5 so that the magnetic recording properties are not impaired by deformation of the recording medium. JP-A 02-260 229 is concerned with improving the life of the magnetic layer and its running properties. In this context, a further magnetic layer as a lower layer between the nonmagnetic substrate and the actual recording layer is proposed as a solution, and the lower layer has a greater modulus of elasticity than the recording layer.

None of these publications permit the production of tape-like magnetic recording media having a satisfactorily high elastic tensile stress range and a satisfactorily high modulus of elasticity.

It is an object of the present invention to remedy the stated disadvantages and to provide a resilient tape-like magnetic recording medium for high tensile stresses varying as a function of time in high-speed tape drives.

We have found that this object is achieved by tape-like, magnetic recording media I comprising a nonmagnetic substrate III, at least one layer applied to this substrate, and, in at least one of these layers, an inorganic needle-shaped pigment II which is suitable as a supporting pigment and has a ratio of the average length to the average diameter of the pigment II of at least 3, wherein the mean modulus of elasticity of the stated layers is not less than 15 GPa in the longitudinal direction of the tape-like recording medium I.

We have also found novel chromium-containing inorganic needle-shaped pigments VI and VII suitable as supporting pigments, processes for their preparation and the use of the pigments for, in particular anisotropic strengthening of polymeric materials.

According to the invention, the modulus of elasticity is understood as meaning the modulus of elasticity in extension E, which is obtained as the ratio of the tensile stress to the longitudinal elongation and can readily be determined in a generally known manner.

Suitable supporting pigments are ferromagnetic and nonferromagnetic inorganic needle-shaped pigments II.

Suitable ferromagnetic pigments II are metallic pigments, such as Fe, Co, Ni and alloys of these elements, and oxidic pigments, such as $\gamma$-$Fe_2O_3$, Co-containing $\gamma$-$Fe_2O_3$, $Fe_3O_4$, preferably chromium-containing oxidic pigments, such as $CrO_2$, and in particular those of the formula VI $$Cr^aO_x \cdot nH_2O \qquad \text{VI}$$

where a is the average valency of the chromium with $3.0 < a \leq 3.25$, preferably $3.0 < a \leq 3.1$, x is the oxygen equivalents determined by the valency of the chromium and n is the water content with $0 < n < (4-a)/2$.

According to the invention, the pigments VI may be composed of 50% by weight of a core and 50% by weight of a shell, it being possible for the atomic ratios of Cr(IV) to Cr(III) in the core and shell to be identical or different.

Suitable nonferromagnetic pigments II are preferably oxidic pigments, such as FeOOH, $\alpha$-$Fe_2O_3$ and in particular chromium-containing pigments of the formula VII $$Cr_2O_3 \cdot nH_2O \qquad \text{VII}$$

where n is from 0 to 0.5.

The pigments VI and VII are obtainable by heating the pigments of the formula VIII $$CrO_x \qquad \text{VIII}$$

where x is $1.8 \leq x \leq 2.2$, at from 400 to 500° C., preferably from 440 to 480° C., particularly advantageously from 450 to 470° C., in a gas containing in particular molecular oxygen, such as air, resulting in reaction times of from 0.5 to 10, preferably from 0.5 to 2, hours, wherein the pigments VIII may be purified before the heating in a manner known per se, for example by washing with water.

Advantageously, the pigments VIII can be treated with organic or, preferably, inorganic compounds, such as mineral bases, advantageously alkali metal hydroxides, alkaline earth metal hydroxides and earth metal hydroxides, for example potassium hydroxide, calcium hydroxide, in particular sodium hydroxide, or their basic salts, for example carbonates or sulfites, in particular sodium sulfite, before the heating. A reaction in inorganic, in particular aqueous solution at a pH of from 7 to 14, in particular from 11 to 13, is advisable, with the exception of sulfites, for which a pH of from 7 to 9 is recommended, at from 10 to 90° C. with reaction times of from 0.5 to 10, in particular from 0.5 to 5, hours.

The pigments VI and VII can also be obtained by first reacting a pigment VIII under hydrothermal conditions at from 110 to 250° C., preferably from 160 to 230° C., in particular from 190 to 210° C., with a reducing agent at from 2 to 500, preferably from 100 to 300, in particular from 150 to 250 bar, in the course of from 10 to 500, preferably from 50 to 250, in particular from 80 to 120, hours. Suitable reducing agents are inorganic or, preferably, organic compounds, such as carboxylic acids, in particular oxalic acid.

The reaction products can be further processed in the reaction mixture or advantageously isolated from the suspension by known methods, such as filtration, and preferably purified, for example washed.

According to the invention, the reaction products are then heated at from 100 to 500° C., preferably from 200 to 400° C., in a gas containing in particular molecular oxygen, such as air, resulting in reaction times of from 0.5 to 10, preferably from 0.5 to 2, hours.

The reaction products can be treated with organic or, preferably, inorganic compounds, such as mineral bases, advantageously alkali metal hydroxides, alkaline earth metal hydroxides and earth metal hydroxides, for example potassium hydroxide, calcium hydroxide, in particular sodium hydroxide, or their basic salts, for example carbonates or sulfites, in particular sodium sulfite, before the heating. A reaction in inorganic, in particular aqueous solution at a pH of from 7 to 14, in particular from 11 to 13, is advisable, with the exception of sulfites, for which a pH of from 7 to 9 is recommended, at from 10 to 90° C. with reaction times of from 0.5 to 10, in particular from 0.5 to 5, hours.

The pigments VI and VII can be treated with organic or, preferably, inorganic compounds, such as mineral bases, advantageously alkali metal hydroxides, alkaline earth metal hydroxides and earth metal hydroxides, for example potassium hydroxide, calcium hydroxide, in particular sodium hydroxide, or their basic salts, for example carbonates or sulfites, in particular sodium sulfite. A reaction in inorganic, in particular aqueous solution at a pH of from 7 to 14, in particular from 11 to 13, is advisable, with the exception of sulfites, for which a pH of from 7 to 9 is recommended, at from 10 to 90° C. with reaction times of from 0.5 to 10, in particular from 0.5 to 5, hours.

As is generally known, the supporting pigments II, VI and VII may contain further chemical elements or compounds. According to the invention, the needle-shaped pigments II, VI and VII have a ratio of the average length of the needles to the average diameter of the needles of from 3:1 to 15:1, preferably from 5:1 to 10:1, and a length of from 50 to 400 nm, preferably from 90 to 300 nm, in particular from 100 to 200 nm. The specific surface area according to DIN 66132 of the pigments VI and VII should be from 30 to 150, preferably from 50 to 100, m²/g. According to the invention, the saturation magnetization of the pigments VI is from 0.1 to 65, preferably from 0.1 to 40, in particular from 0.1 to 22, nTm³/g and the residual induction is from 0.05 to 24, preferably from 0.05 to 12, in particular from 0.05 to 5, nTm³/g.

The pigments II, preferably VI and VII, are suitable for, in particular, anisotropic strengthening of polymeric materials. Such polymeric materials may advantageously be used for coating surfaces, for example films, or three-dimensional bodies, such as cylinders, for example wires.

For the production of polymeric materials or layers strengthened in this manner, pigments II, in particular VI or VII, are incorporated, according to the invention, into melts or solutions of polymeric materials or melts or solutions of compounds from which polymeric materials can be prepared, and the mixtures are then cured or allowed to solidify.

For the anisotropic strengthening of polymeric materials, as can be particularly advantageously used in the novel magnetic recording media I, the supporting pigments II, in particular VI or VII, can be oriented before the curing or solidification of the polymeric materials.

In the case of nonferromagnetic supporting pigments, this orientation can be achieved, for example, by rheological measures, such as pouring the mixture through a narrow gap. In the case of ferromagnetic supporting pigments II, in particular VI, orientation can advantageously be effected by means of an external magnetic field.

In particularly advantageous magnetic recording media in which a layer V containing a ferromagnetic supporting pigment II is present between a substrate III and a layer IV suitable for information storage, the orientation ratio in the layer V should be at least 2.5 and that in the layer IV at least 4.0. The orientation ratio is understood as meaning the quotient of the residual induction of the tape-like magnetic recording medium in the running direction and the residual induction of the magnetic recording medium perpendicular to this direction. The orientation of the pigments II, preferably VI and VII, can be determined by ultrathin sections. For this purpose, ultrathin sections having a thickness of from 0.1 to 0.2 μm are viewed by means of a transmission electron microscope at not less than 20,000 times magnification. In a measuring field about 20 μm wide, from 50 to 100 needle-shaped pigments per ultrathin section are randomly selected and the average diameter in the longitudinal direction of the tape ($d_L$) and in the transverse direction ($d_T$) is determined. Where $$d_L \geq 2 \cdot d_T,$$

the pigments are considered to be oriented predominantly in the longitudinal direction of the tape.

Tape-like magnetic recording media I are known to contain a nonmagnetic substrate III and at least one layer (magnetic layer) IV suitable for the magnetic information storage.

The novel magnetic recording media I may contain the supporting pigments II described in the nonmagnetic substrate III, in at least one of the layers IV suitable for information storage or in at least one layer V. The layer V may be arranged between the substrate III and a magnetic layer IV or on that side of the substrate III which faces away from a magnetic layer IV.

Nonmagnetic substrates III which may be used are the conventional rigid or flexible substrates, in particular films of linear polyesters, such as polyethylene terephthalate, which generally have thicknesses of from 4 to 200 μm, in particular from 6 to 36 μm.

The magnetic layer IV of the novel magnetic recording media I may be based on either vapor-deposited or sputtered, metallic thin films which essentially contain ferromagnetic elements, such as Fe, Co and Ni or their alloys, or on ferromagnetic pigments.

For the production of such layers, the pigments can, if required, be dispersed with fillers in a manner known per se in a solution comprising a solvent, binder and further additives, such as lubricant and dispersant, and can be applied to a nonmagnetic substrate. After the orientation of the ferromagnetic pigments in a strong magnetic field, the further processing can be carried out in the usual manner, for example by removing the solvent and, if required, curing the binder with subsequent calendering.

Suitable magnetic pigments are the conventional oxidic pigments, such as $\gamma$-$Fe_2O_3$, $Fe_3O_4$ and $CrO_2$, or metallic pigments, such as Fe, Co and Ni. As is generally known, these pigments may contain further chemical elements or compounds.

As usual, the solvents used may be water, ethers, such as tetrahydrofuran or dioxane, ketones, such as methyl ethyl ketone or cyclohexanone, esters, such as ethyl acetate, or hydrocarbons, such as alkanes or aromatics, or mixtures of these solvents.

Suitable binders are known to be polyacrylates, polymethacrylates, polyacrylamide, vinyl polymers, such as polystyrene, polyvinyl chloride, polyvinyl acetate, polyvinyl propionate or polyacrylonitrile, cellulose-containing binders, such as cellulose esters, in particular cellulose nitrates, cellulose acetate, cellulose triacetate, cellulose acetopropionate or cellulose acetobutyrate, phenoxy resins, epoxy resins or, preferably, polyurethanes and block polymers or copolymers of these compounds. Suitable polyurethanes are described, for example, in DE-B 11 06 959, DE-B 27 53 694, DE-A 32 26 995, DE-A 32 27 163 and DE-A 32 27 164. Polyurethanes may be used as the sole binders or, preferably, with other polymers, such as polyvinyl formals, phenoxy resins, PVC or PVC copolymers.

The abrasion resistance and the modulus of elasticity of the polyurethanes and polyurethane mixtures can be further increased by crosslinking these components with polyfunctional isocyanates, in particular those having more than 2 isocyanate groups. Such crosslinking agents can advantageously be obtained by an addition reaction of bifunctional isocyanates, such as toluylene diisocyanate, hexamethylene diisocyanate or isophorone diisocyanate of the formula

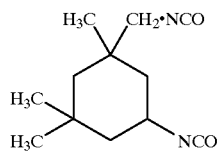

with polyhydric alcohols or by biuret or isocyanurate formation. Suitable crosslinking agents are in particular an adduct of toluylene diisocyanate with trimethylolpropane and diethylene glycol. The amount of crosslinking agent required in relation to the amount of polyurethane used for achieving optimum performance characteristics can readily be determined in a few simple preliminary experiments.

Lubricants usually used are carboxylic acids of 10 to 20 carbon atoms, in particular stearic acid and palmitic acid, derivatives of carboxylic acids, such as their salts, esters and amides, or fluorinated hydrocarbons.

Cationic, nonionic or, preferably, anionic surfactants, such as carboxylates, sulfonates, phosphonates or phosphates of hydrocarbons, in particular alkyl or aryl compounds, may be used in the usual manner as dispersants.

Suitable fillers are known to be inorganic and organic pigments, eg. alumina, silica, carbon black, polyethylene and polypropylene.

In the production of magnetic recording media I, a plurality of magnetic layers IV, at least one of which contains a supporting pigment II, or a plurality of layers V, at least one of which contains a supporting pigment II, can be applied to the substrate III.

EXAMPLES

Preparation of a $CrO_2$ Pigment

Example 1

554 g of $CrO_3$ were dispersed in 159 g of water in the course of 10 minutes. 70 g of potassium antimonyl tartrate (PAT) were slowly added to the mixture at 40–60° C. and stirring was carried out for 5 minutes at 60° C. 170 g of $Cr_2O_3$ were then added at 20–30° C. in the course of 3 minutes with stirring.

Homogenization was then carried out for 15 minutes with thorough stirring, the temperature increasing to 80° C.

After cooling to 30° C., the mixture was heated to 320–350° C. in an autoclave in the course of 3 hours and kept at this temperature for 9 hours, the maximum pressure being 360 bar. The mixture was then cooled, the pressure in the autoclave being let down at a temperature of the mixture of 200° C.

The product was then dried at 50° C. and milled.

The properties are shown in Table 1.

Examples 2a–g 1000 g of the product from Example 1 were suspended at 25° C. in a mixture of 780 g of oxalic acid in 1490 g of water with stirring. The mixture was then kept in an autoclave for 96 hours at 210° C. under the resulting autogenous pressure of the mixture.

The product was then heated in air under the process conditions stated in Table 2.

The properties are shown in Table 2.

Example 3

100 g of the product from Example 1 were dispersed in 1000 g of water and wet-milled. Thereafter, the mixture was filtered, the filter cake was washed with water until the conductivity of the wash water at 20° C. was <50 $\mu$S and the residue was then dispersed in 1000 g of water.

A solution of 11 g of sodium sulfite in 50 g of water was then added to the mixture and stirring was carried out for 30 minutes at from 20 to 28° C.

The product was then filtered and the filter cake was washed until the wash water had a conductivity at 20° C. of <50 $\mu$S.

The filter cake was dried at 50° C. and granulated to a pellet size of <1 mm.

The properties are shown in Table 1.

Example 4

100 g of the product from Example 1 were dispersed in 1000 g of water and wet-milled. Thereafter, the mixture was filtered, the filter cake was washed with water until the conductivity of the wash water at 20° C. was <50 $\mu$S and the residue was then dispersed in 1000 g of water. The pH was then brought to 12 with 15% strength by weight sodium hydroxide solution and stirring was carried out for 2 hours at 55° C. and pH 12.

The product was then filtered and the filter cake was washed until the wash water had a conductivity at 20° C. of <50 $\mu$S.

The filter cake was dried at 50° C. and granulated to a pellet size of <1 mm.

The properties are shown in Table 1.

Example 5

100 g of the product from Example 1 were dispersed in 1000 g of water and wet-milled. Thereafter, the mixture was filtered, the filter cake was washed with water until the conductivity of the wash water at 20° C. was <50 μS and the residue was then dispersed in 1000 g of water.

The mixture was heated to 85° C. with stirring and blanketing with nitrogen, a solution of 20 g of sodium sulfite in 100 g of water was added at 85° C. and stirring was carried out for 2 hours at 85° C.

The product was then filtered and the filter cake was washed until the wash water had a conductivity at 20° C. of <50 μS.

The filter cake was dried at 50° C. and granulated to a pellet size of <1 mm.

The properties are shown in Table 1.

Example 6

100 g of the product from Example 1 were dispersed in 1000 g of water and wet-milled. Thereafter, the mixture was filtered and the filter cake was washed with water until the conductivity of the wash water at 20° C. was <50 μS, dried at 50° C. and granulated to a pellet size of <1 mm.

The product was heated in a rotary tubular furnace with a residence time of 30 minutes at 460° C. under air.

The properties are shown in Table 1.

Example 7

100 g of the product from Example 6 were dispersed in 1000 g of water and wet-milled. Thereafter, the mixture was filtered, the filter cake was washed with water until the conductivity of the wash water at 20° C. was <50 μS and the residue was then dispersed in 1000 g of water.

The pH was then brought to 12 with 15% strength by weight aqueous sodium hydroxide solution and stirring was carried out for 2 hours at 55° C. and pH 12.

The product was then filtered off and the filter cake was washed until the wash water had a conductivity at 20° C. of <50 μS.

The filter cake was dried at 50° C. and granulated to a pellet size of <1 mm.

The properties are shown in Table 1.

Production of a magnetic recording medium

Example 8

A first dispersion of 1000 parts by weight of chromium oxide pigment according to Example 5, 75 parts by weight of a vinyl polymer having polar anchor groups, 95 parts by weight of a polyurethane having polar anchor groups, 25 parts by weight of stearic acid, 180 parts by weight of tetrahydrofuran and 180 parts by weight of dioxane was applied to a 14 μm thick nonmagnetic polyethylene terephthalate substrate in a layer thickness of 1.2 μm. A second dispersion comprising 1000 parts by weight of a ferromagnetic metal pigment having a coercive force of 133 kA/m and a specific surface area of 52 m²/g, 80 parts by weight of α-$Al_2O_3$ having a particle size of 0.2 μm, 77 parts by weight of a vinyl polymer having polar anchor groups, 77 parts by weight of a polyurethane having polar anchor groups, 10 parts by weight of a phosphoric ester, 25 parts by weight of stearic acid, 22.5 parts by weight of a polyisocyanate, 1837.5 parts by weight of tetrahydrofuran and 1837.5 parts by weight of dioxane was applied to this layer in a layer thickness of 0.4 μm, oriented by means of a magnetic orienting field, dried and calendered.

A novel magnetic recording medium having very good magnetic and mechanical properties was obtained.

Example 9

The procedure was as in Example 8, except that the first dispersion contained 1000 parts by weight of chromium oxide pigment according to Example 7 instead of 1000 parts by weight of chromium oxide pigment according to Example 5.

A novel magnetic recording medium having excellent magnetic and mechanical properties was obtained.

Example 10

The procedure was as in Example 8, except that the first dispersion contained 1000 parts by weight of α-$Fe_2O_3$ pigments having an average needle length of 125 nm and an average needle diameter of 25 nm, instead of the 1000 parts by weight of chromium oxide pigment.

A novel magnetic recording medium having good magnetic and mechanical properties was obtained.

Comparative Example

The procedure was as in Example 8, except that the first dispersion contained 1000 parts by weight of $TiO_2$ pigment having an average length of 60 nm and an average diameter of 30 nm, instead of the 1000 parts by weight of chromium oxide pigment.

The layers of the magnetic recording medium had a modulus of elasticity of 13 GPa.

TABLE 1

|  | EX. 1 | EX. 3 | EX. 4 | EX. 5 | EX. 6 | EX. 7 |
|---|---|---|---|---|---|---|
| Length [nm] | 130 | 130 | 130 | 130 | 130 | 130 |
| Length/thickness | 7 | 7 | 7 | 7 | 7 | 7 |
| SSA [m²/g] | 73 | 73 | 73 | 73 | 64 | 64 |
| HC [kA/m] | 15 | 15 | 16 | 15 | 0 | 0 |
| $δ_r$ [nTm³/g] | 21 | 16 | 17 | 13 | 1 | 1 |
| $δ_m$ [nTm³/g] | 77 | 59 | 64 | 49 | 6 | 5 |

TABLE 2

| Example | Heating | Hc [kA/m] | $δ_r$ [nTm³/g] | $δ_m$ [nTm³/g] | SSA [m²/g] |
|---|---|---|---|---|---|
| 2a* | unheated | 0 | 0 | 1 | 76 |
| 2b | 1 h/250° C. | 7 | 1 | 5 | 74.6 |
| 2c | 1 h/300° C. | 17 | 3 | 14 | 73.6 |
| 2d | 1 h/350° C. | 19 | 11 | 39 | 71.2 |
| 2e | 1 h/400° C. | 10 | 7 | 33 | 71.5 |
| 2f | 1 h/450° C. | 3.3 | 2 | 18 | 68.8 |
| 2g | 1 h/500° C. | 6.2 | ≦1 | 7 | 62.8 |

*Fully Reduced (Now Magnetic)
2d Magnetic

We claim:

1. A magnetic recording medium I having a tape form, comprising a nonmagnetic substrate III, at least one layer applied to this substrate, whereby at least one of these layers is a layer IV for magnetic information storage containing a binder and ferromagnetic pigments, and comprising in at least one of these layers a needle-shaped chromium-containing pigment II of the formula VI

   VI where
- a is the average valency of the chromium with $3.0 < a \leq 3.25$,
- x is the oxygen equivalents determined by the valency of the chromium and
- n is the water content with $0 < n < (4-a)/2$,
- as a ferromagnetic supporting pigment having a ratio of the average length to the average diameter of the pigment II of at least 7 and an orientation ratio of at least 4, wherein the mean modulus of elasticity of the stated layers is not less than 15 GPa in the longitudinal direction of the recording medium I.

2. A magnetic recording medium I as claimed in claim 1, having a modulus of elasticity in the longitudinal direction of the recording medium I of not less than 20 GPa.

3. A recording medium I as claimed in claim 1, comprising a layer V which contains a binder and the supporting pigment II, wherein the layer V is arranged between the nonmagnetic substrate III and the layer IV for magnetic information storage.

4. A recording medium I as claimed in claim 1, comprising a layer V which contains a binder and the supporting pigment II, wherein the nonmagnetic substrate III is arranged between the layer V and the layer IV for magnetic information storage.

5. A recording medium I as claimed in claim 1, wherein the layer IV for magnetic information storage contains the supporting pigment II.

6. A recording medium I as claimed in claim 1, wherein the supporting pigment II has a ratio of the average length of the needles to the average diameter of the needles of from 3:1 to 10:1.

7. A recording medium I as claimed in claim 1, wherein the pigments VI comprise mixtures of Cr(IV) and Cr(III) oxides and consist of
   a) 50% by weight of a core and
   b) 50% by weight of a shell and
the atomic ratios of Cr(IV) to Cr(III) in the core and in the shell are identical.

8. A recording medium I as claimed in claim 1, wherein the pigments VI comprise mixtures of Cr(IV) and Cr(III) oxides and consist of
   a) 50% by weight of a core and
   b) 50% by weight of a shell and
the atomic ratio of Cr(IV) to Cr(III) in the shell is greater than that in the core.

9. A recording medium I as claimed in claim 1, wherein the pigments VI comprise mixtures of Cr(IV) and Cr(III) oxides and consist of
   a) 50% by weight of a core and
   b) 50% by weight of a shell and
the atomic ratio of Cr(IV) to Cr(III) in the core is greater than that in the shell.

10. A recording medium I as claimed in claim 1, containing
   a) a nonmagnetic substrate III and, arranged thereon,
   b) a layer V which contains a binder and the chromium-containing needle-shaped pigment of formula VI having a ratio of the average length to the average diameter of the pigment of at least 7 and an orientation ratio of at least 4 and, arranged thereon,
   c) a layer IV for information storage and containing a binder and ferromagnetic metallic pigments,
the modulus of elasticity in the longitudinal direction of the recording medium I being greater than 30 GPa.

11. A recording medium I as claimed in claim 1, containing pigments VI oriented in an external magnetic field.

* * * * *